No. 631,044. Patented Aug. 15, 1899.
R. O. HEINRICH.
STANDARD VOLTAIC CELL.
(Application filed Apr. 4, 1899.)
(No Model.)
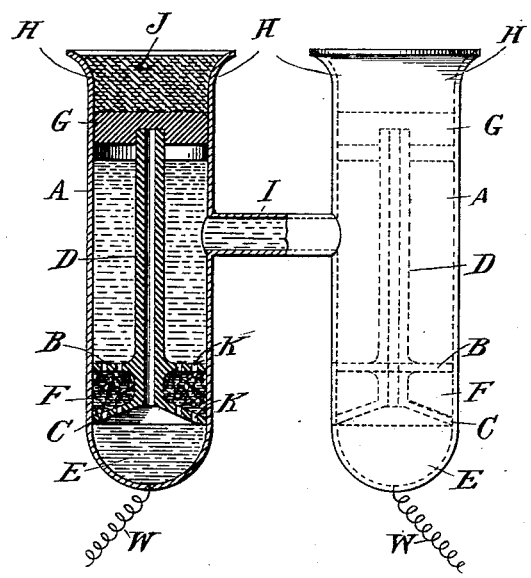

UNITED STATES PATENT OFFICE.

RICHARD O. HEINRICH, OF BERLIN, GERMANY, ASSIGNOR TO THE WESTON ELECTRICAL INSTRUMENT COMPANY, OF NEWARK, NEW JERSEY.

STANDARD VOLTAIC CELL.

SPECIFICATION forming part of Letters Patent No. 631,044, dated August 15, 1899.

Application filed April 4, 1899. Serial No. 711,654. (No model.)

*To all whom it may concern:*

Be it known that I, RICHARD O. HEINRICH, a citizen of the United States, residing at Berlin, Germany, have made a new and useful Invention in Standard Voltaic Cells, of which the following is a specification.

My invention is directed to improvements in voltaic cells of the H type, in which liquid electrodes are utilized—such, for instance, as are shown and described in United States Patent No. 494,827, granted April 4, 1893, to Edward Weston; and its objects are, first, to provide a diaphragm or diaphragms between the liquid electrodes and the electrolyte or battery solution which shall permit of the liberation of any air that may accumulate thereunder on the insertion of such diaphragm or diaphragms in position in the cells, and, second, to provide means for maintaining the diaphragms permanently in position between the liquid electrodes and electrolyte or battery solution.

Heretofore it has been customary in the construction of voltaic cells of the type referred to to separate the battery solution from the liquid electrodes by porous diaphragms of the same diameter as the internal diameters of the cells themselves. It is found in practice, however, that such diaphragms will retain air beneath them and also that they often become liberated and float or swim in the battery solution, thereby practically defeating the object for which they are designed. My invention effectually overcomes these objectionable features, and will be fully understood by referring to the accompanying drawing, which is a part sectional, part side elevational, view of a well-known form of voltaic cell of the H type, my improvement being illustrated in connection therewith in sectional view in one of the cells and in dotted lines in the other of said cells.

Referring to the drawing in detail, H H represent the individual cells of a voltaic battery of the H type, said cells being condected together in the usual manner by a transverse tube I.

E E represent the liquid electrodes in the bottom of said cells, and W W the conductors of the battery, extending through the bottoms of the cells to the liquid electrodes.

A represents the electrolyte or battery solution. This electrolyte or battery solution A and the liquid electrodes E E may be of the same nature as are the corresponding elements of the Weston cell disclosed in the before-mentioned patent, No. 494,827, or they may be of any other well-known material generally utilized in such cells, and the perforated diaphragms B C B C and tubes D D may be of hard rubber, glass, or any material which will withstand the action of the liquids used.

My improvement consists in constructing the diaphragms which separate the electrodes from the electrolyte or battery solution of two disks B C, either integral with or otherwise secured to an escape or vent tube D, extending upward axially through each cell, said disks being both perforated, as shown at K K, F being the usual porous packing, such as asbestos, secured between the disks B C. The lower disk C is preferably funnel-shaped, as shown, for the purpose of affording greater facility for the escape of air on inserting the diaphragm in place.

On assembling the parts of a voltaic cell of the character indicated and provided with my novel form of diaphragm the liquid electrodes E E of the usual materials are inserted in the cells H H, after which the space between the disks B C is packed with a porous-like material, such as asbestos, and the two diaphragms are then inserted in place until the funnel-shaped disks C rest just above their respective electrodes. The electrolyte or battery solution A is then poured into the cells H until they are filled to points near the tops of the escape or vent tubes D, after which corks are inserted about the ends of said tubes and the cells sealed with paraffin G G, an additional sealing being effected by corks J or other means, if preferred.

It is apparent that the escape or vent tubes D being secured at their upper ends in the manner described will prevent at all times the upward movement of the diaphragms, thus always maintaining them in a fixed relation to the electrodes E E and constituting independent means for maintaining such fixed relation.

I do not limit myself to the particular structure of diaphragm herein shown and described for a voltaic cell provided with liquid electrodes, as it is obvious that the general form or structure might be varied at will and still come within the scope of my claims, so long as the diaphragm itself be provided with means for affording an escape or vent for air accumulated thereunder, and also so long as said diaphragm itself be provided with independent means for securely holding it in place above the electrode, so that it cannot float or swim in the electrolyte or battery solution.

Having thus described my invention, what I claim, and desire to secure by Letters Patent of the United States, is—

1. In a voltaic cell having liquid electrodes, a diaphragm located above each electrode and separating the same from the electrolyte or battery solution, each diaphragm being secured to a vent-tube which extends above the electrolyte or battery solution; in combination with means at the top of the cell for securing the vent-tubes directly thereto, substantially as described.

2. In a voltaic cell having liquid electrodes, a diaphragm located above each electrode and separating the same from the electrolyte or battery solution, and provided each with an upwardly-extending vent-tube secured directly to sealing means at the top of the cell, substantially as described.

3. In a voltaic cell having liquid electrodes, a diaphragm consisting of perforated disks and porous material packed between them, in combination with means extending from the disks to the top of the cell and additional means for firmly securing said parts, substantially as described.

4. In a voltaic cell of the H type, a diaphragm consisting of a porous packing and two disks secured to an escape or vent tube, in combination with means at the top of the cell for securing and sealing said tube, substantially as described.

5. In a voltaic cell of the H type, a diaphragm consisting of two perforated disks, the lower one being funnel-shaped, in combination with an escape or vent tube securing said disks together and means near the top of the cell for sealing and securing said vent-tube, substantially as described.

In testimony whereof I have hereunto subscribed my name this 18th day of March, 1899.

RICHARD O. HEINRICH.

Witnesses:
WOLDEMAR HAUPT,
HENRY HASPER.